Nov. 8, 1927.
E. G. MERRICK
1,648,694
GROUNDING ARRANGEMENT
Filed April 30, 1927
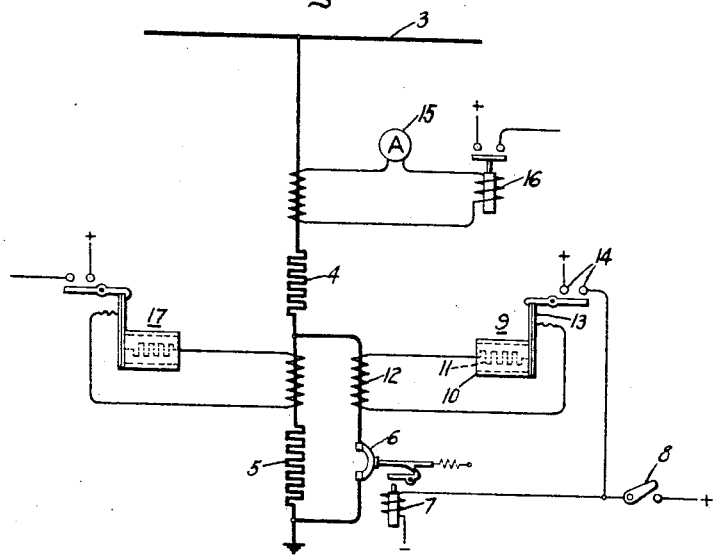
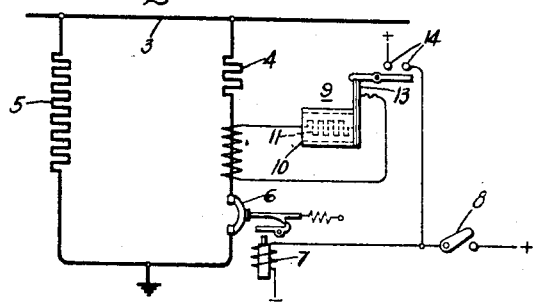
Inventor:
Eldridge G. Merrick,
by
His Attorney.

Patented Nov. 8, 1927.

1,648,694

UNITED STATES PATENT OFFICE.

ELDRIDGE G. MERRICK, OF SCHENECTADY, NEW YORK, ASSIGNOR TO GENERAL ELECTRIC COMPANY, A CORPORATION OF NEW YORK.

GROUNDING ARRANGEMENT.

Application filed April 30, 1927. Serial No. 187,720.

My invention relates to improvements in grounding arrangements and more particularly to improvements in current limiting grounding arrangements for the neutrals of electric systems.

In electric systems where the neutral is grounded through a current limiting device such as a resistor, the impedance of the ground connection should not be high enough so to limit the current as to interfere with the proper operation of the relays which are to operate on the occurrence of ground faults. On the other hand, in the case of the failure of the fault responsive apparatus properly to function, the impedance should be high enough so to limit the current as to minimize damage to the system. Heretofore the impedance of the current limiting devices has been determined in accordance with the limitations imposed by proper relaying without regard to damage to the system in case of the failure of the fault responsive apparatus. In order to minimize such damage, a higher impedance than that necessary for proper relaying is desirable after the expiration of the time in which the relays should operate. While the neutral connection could be opened to obtain this feature, to do so would sacrifice the advantages of the grounded neutral. It is then an object of my invention to provide an improved current limiting grounding arrangement such that proper relaying particularly for ground faults is possible with suitable current limiting action in case of the failure of the fault responsive apparatus and with the use of low duty and economical current limiting devices.

My invention will be better understood from the following description when considered in connection with the accompanying drawing and its scope will be pointed out in the appended claims.

In the accompanying drawing Fig. 1 illustrates diagrammatically a current limiting grounding arrangement embodying my invention and Fig 2 illustrates diagrammatically a modification of my invention.

Referring now to the drawing, a neutral conductor such as a neutral bus 3 from a neutral point or points of an electric system has a ground connection comprising a plurality of current limiting devices such as resistors 4, 5 which are connected and arranged normally to form a relatively low impedance connection between the neutral point and ground, but are arranged to be controlled in accordance with the current in the ground connection so as to effect a change in the impedance thereof.

As shown in Fig. 1, the resistors 4, 5 may be connected in series with each other between the neutral and ground. In accordance with my invention the resistor 4 is a relatively low duty low resistance device while the resistor 5 is a relatively high duty high resistance device which is normally short-circuited by suitable circuit controlling means such as a switch 6. By duty I mean the watt-seconds or $I^2RT$ capacity of the resistor where I represents the current in the resistor in amperes, R the ohms resistance of the resistor and T the time in seconds. The switch 6 is shown as a circuit breaker of the latched closed type comprising a trip coil whose circuit may be controlled by a manual switch 8. For opening the switch 6 and thus increasing the resistance of the ground connection after a predetermined time which should be sufficient for the protective relays of the system to operate on the occurrence of ground faults, I provide means such as a relay 9 responsive to the current in the ground connection. The relay 9 may be of the thermally responsive type which operates in accordance with the heating of the resistor 4. Examples of such relays are known to the art, the one chosen for illustration being disclosed in United States Letters Patent 1,501,017 to C. I. Hall issued July 8, 1924, and assigned to the same assignee as this invention. This relay comprises a thermal storage mass 10, a heating coil 11 connected to be energized in accordance with the current in the circuit of the device to be protected as through the current transformer 12, a thermostatic strip 13 in circuit with the coil 11 arranged to be heated in accordance with the heating of the mass 10 as well as the current of the circuit, and contacts 14 controlled in response to a predetermined expansion of the strip 13 and arranged in the circuit of the trip coil 7.

In the event of current in the ground connection which may be indicated visually by an ammeter 15 or audibly by a suitable alarm not shown but arranged to be controlled by a relay 16, the resistor 4 will tend to limit the current and will heat. If the system protective relays fail to function before the safe duty of the resistor 4 is exceeded, the thermal relay 9 will effect the closing of the circuit of the trip coil 7 thereby opening the shunt circuit around the resistor 5 and effecting an increase in the resistance of the ground connection. In this manner the current in the ground connection is so limited as to prevent serious damage to the system in case the protective system should fail properly to function. In order to notify the operator when the duty on the resistor 5 is approaching the safe limit, a thermal relay 17 similar to the relay 9 may be arranged to control the circuit of an indicating or a switching device not shown.

Within the ordinary limits of time ratings of resistors, radiation is not very pronounced and the size, weight and cost of the resistor varies, therefore, almost directly with the duty or watt-seconds developed. The duty of a current limiting arrangement embodying my invention as compared with the duty of a single resistor will be apparent if it be assumed for example that the single resistor has a resistance of 2 ohms and is designed to carry 3000 amperes for 2 minutes, while the resistor 4 has a resistance of 2 ohms and is designed to carry 3000 amperes for 5 seconds and 750 amperes for 115 seconds and the resistor 5 has a resistance of 6 ohms and is designed to carry 750 amperes for 115 seconds. The watt-seconds developed in the two cases are as follows:

Single resistor _____ $3000^2 \times 2 \times 120 = 2,160,000,000$
Resistor 4 _____ $3000^2 \times 2 \times 5 = 90,000,000$
                          $750^2 \times 2 \times 115 = 129,375,000$
Resistor 5 _____ $750^2 \times 6 \times 115 = 388,125,000$ Resistors 4 and 5 _____ $607,500,000$ From this it is obvious that the duty on the single resistor in the ground connection is about 3.6 times the duty on the combination of resistors embodying my invention. Moreover with the single resistor, the current is not limited beyond the intial amount, whereas with resistors arranged in accordance with my invention the fault responsive apparatus is given sufficient time, at least 5 seconds in the example given, in which to operate on a relatively large current and if the apparatus does not operate within this time, the current is so limited as to minimize damage to the system. While the actual saving in cost is not the same as the duty ratio because of additional devices comprising the switch 6 and the relay 9, actual comparisons of total equipments show that relative costs approximate the duty ratio.

In the modification of my invention shown in Fig. 2, the resistor 4 is normally connected in parallel with the resistor 5 through the switch 6 which is arranged to be opened in response to the heating of the resistor 4 by the thermal relay 9 so as to effect an increase in the resistance of the ground connection. If the resistor 4 be assumed as 2⅔ ohms and the resistor 5 as 8 ohms, the resistance of the two in parallel is 2 ohms. Assuming times and initial and final currents as before the total duty and, therefore, the duty ratio as compared with a single resistor in the ground connection will be as heretofore given.

Although in the illustrated embodiments of my invention, the current limiting devices are shown as resistors, it is of course to be understood that other impedance devices such as reactors may be used.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States, is:

1. In combination with an electric circuit having a neutral point, a ground connection therefor comprising a plurality of current limiting devices connected and arranged normally to form a relatively low impedance connection between the neutral point and ground and means for effecting a change in the impedance of the ground connection comprising a switch arranged to be controlled in accordance with the heating of one of the devices.

2. In combination with an electric circuit having a neutral point, a ground connection therefor comprising two resistors connected and arranged normally to form a relatively low resistance connection between the neutral point and ground and means for effecting an increase in the resistance of the ground connection comprising a switch arranged to be controlled in accordance with the heating of one of the resistors.

3. In combination with an electric circuit having a neutral point, a ground connection therefor comprising two relatively high and low duty current limiting devices connected and arranged normally to form a relatively low impedance connection between the neutral point and ground and thermal responsive means operative in accordance with the heating of one of the devices to effect an increase in the impedance of the ground connection.

4. In combination with an electric circuit having a neutral point, a ground connection therefor comprising two relatively high and low duty current limiting devices connected and arranged normally to form a relatively low impedance connection between the neutral point and ground, and means responsive to the current in one of said devices for controlling the current in said device.

5. In combination with an electric circuit having a neutral point, a ground connection therefor comprising a relatively low duty current limiting device, a relatively high duty current limiting device and thermal responsive means for effecting the insertion of said high duty device in series with the low duty device between the neutral point and ground.

6. In combination with an electric circuit having a neutral point, a connection between the neutral point and ground comprising two relatively high and low duty resistors connected in series, means comprising a switch arranged normally to short-circuit the high duty resistor and thermal responsive means for effecting the opening of said switch in accordance with the heating of the low duty resistor.

7. In combination with an electric circuit having a neutral point, a ground connection therefor comprising two resistors of relatively high and low duties and means operative in accordance with the heating of one of the resistors to effect the insertion of the other in series therewith between the neutral point and ground.

In witness whereof, I have hereunto set my hand this 28th day of April, 1927.

ELDRIDGE G. MERRICK.